C. F. LEFEVER.
LIQUID PISTOL.
APPLICATION FILED OCT. 11, 1915.
Reissued May 9, 1916.
14,129.
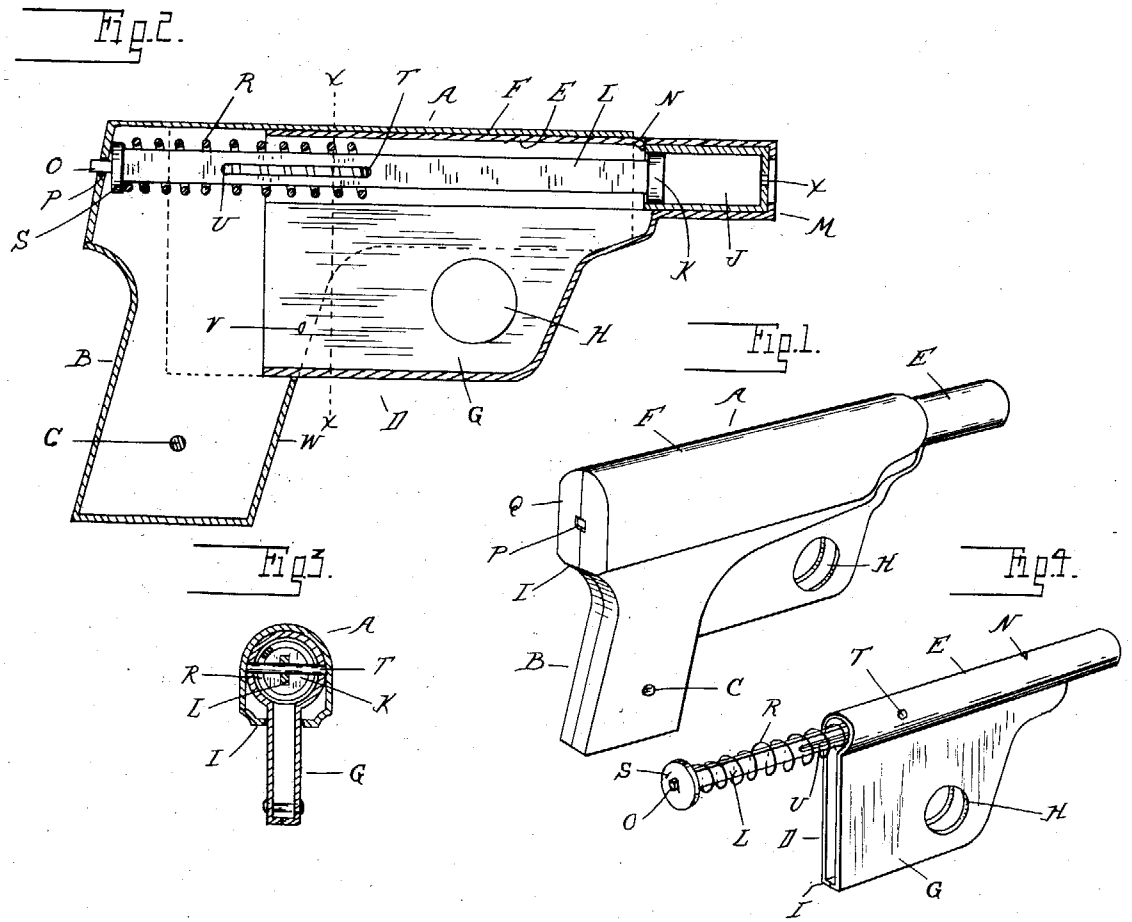
Inventor
Charles F. Lefever
By Whittemore, Hulbert & Whittemore
Attorneys

UNITED STATES PATENT OFFICE.

CHARLES F. LEFEVER, OF PLYMOUTH, MICHIGAN, ASSIGNOR TO DAISY MANUFACTURING COMPANY, OF PLYMOUTH, MICHIGAN, A CORPORATION OF MICHIGAN.

LIQUID-PISTOL.

14,129. Specification of Reissued Letters Patent. Reissued May 9, 1916.

Original No. 1,143,839, dated June 22, 1915, Serial No. 18,487. Application for reissue filed October 11, 1915. Serial No. 55,318.

*To all whom it may concern:*

Be it known that I, CHARLES F. LEFEVER, a citizen of the United States of America, residing at Plymouth, in the county of Wayne and State of Michigan, have invented certain new and useful Improvements in Liquid-Pistols, of which the following is a specification, reference being had therein to the accompanying drawings.

The invention relates to liquid pistols, and consists in the provision of a simple and efficient construction of pistol for throwing or discharging liquid; in a structure that may be easily and cheaply manufactured; and further, in the provision of a pistol that may be readily loaded.

The invention resides in the peculiar construction, arrangement and combination of parts as more fully hereinafter set forth.

In the drawings:—Figure 1 is a perspective view of a pistol embodying the invention; Fig. 2 is a longitudinal, central section therethrough; Fig. 3 is a section on the line *x—x* of Fig. 2; and Fig. 4 illustrates a detail of construction.

A designates the barrel of the pistol and B the handle, these parts being preferably made from a sheet metal stamping folded into the form shown. The two sections of the handle are secured together by a rivet C. Arranged within the barrel for movement longitudinally thereof is a member D having a cylindrical portion E fitting the cylindrical portion F in the barrel A, and provided with a comparatively flat portion G provided with a finger opening H that in effect forms the trigger. The cylindrical portion E and the part G are also formed from a sheet metal stamping folded into the shape illustrated in Fig. 4. Below the cylindrical portion F the barrel A is provided with flanges I spaced to form guides for the portion G. Arranged within the cylindrical portion E at the forward end thereof is a liquid receptacle or cylinder J within which is positioned the head K of the plunger L. The cylinder J is secured in place by an annular flange M at the front of the cylindrical portion E, and a lug N struck inwardly out of the cylindrical portion E.

O is a lug at the rear of the plunger L, engaging an aperture P in the closed end Q of the barrel A, and R is a spring sleeved upon the plunger L. One end of this spring engages an abutment S on the plunger at the rear thereof, while the forward end of the spring contacts with a pin T carried by the portion E of the member D.

U is a slot extending longitudinally of the plunger and within which the pin T is arranged.

The spring R acts to project the member D outwardly. Outward movement of the member D is limited by lugs V struck out from the portion G and adapted to engage the inturned flanges W of the handle B.

In use, assuming that the parts are as shown in Fig. 2, to fill the cylinder J with liquid, the operator moves the member D rearwardly to the position shown in dotted lines, and then inserts the end of the pistol into the liquid. The operator then releases the member D and allows the spring R to return the parts to the position shown in full lines in Fig. 2. During the return of the parts to the latter position, liquid will be drawn into the cylinder J through the opening X. To discharge the liquid, the operator then draws upon the trigger H to move the member D to the position shown in dotted lines in Fig. 1.

The flat portion G which forms the actuating member for telescopically collapsing the barrels and ejecting the liquid has the appearance not only of the trigger but of the guard also. Thus the pistol closely resembles a powder pistol in appearance. Furthermore, the liquid is ejected by the direct pressure of the finger upon the trigger member.

What I claim as my invention is:—

1. In a liquid pistol, the combination of a barrel, a stationary piston therein including its head and a liquid barrel within which the head is arranged, a movable member arranged in the barrel and carrying the liquid barrel, and a power storing spring adapted to act on said member.

2. In a liquid pistol, the combination of a barrel, a stationary piston therein including its head and a liquid barrel within which the head is arranged, a movable member arranged in the barrel and carrying the liquid barrel, and a power storing spring adapted to act on said member, the latter being provided with a portion forming a trigger.

3. In a liquid pistol, the combination of a barrel, a stationary piston therein including its head, a member arranged in said barrel for longitudinal sliding movement and having a portion projecting therewithout, provided with a trigger part, a power storing spring acting upon said member, and a liquid cylinder arranged in said member within which said head is positioned.

4. In a liquid pistol, the combination of a barrel, a stationary piston therein including its head, a member arranged in said barrel for longitudinal movement, a spring acting upon said member to hold the same in one position of adjustment, a liquid cylinder within which said head is arranged, said cylinder being positioned within the forward end of said member and secured thereto against longitudinal movement.

5. In a liquid pistol, the combination of a barrel, a stationary piston therein, a member arranged in said barrel for longitudinal movement, a spring acting upon said member, the forward end of said member being cylindrical, a liquid cylinder arranged in said cylindrical end, and means for retaining said member in said cylindrical end.

6. In a liquid pistol, a barrel containing a liquid chamber telescopically collapsible to eject the liquid, and a movable trigger member for collapsing said barrel.

7. In a liquid pistol, a barrel comprising telescopically-engaged members containing a liquid chamber, a handle grip on one of said members, and a trigger member on the other of said members.

8. In a liquid pistol, a barrel and handle member, a trigger member slidable parallel to said barrel member and into said handle member, and liquid-ejecting means operated by the movement of said trigger member.

9. In a liquid pistol, two telescopically-engaged barrel members formed of sheet metal stampings, a handle integral with one of said members, and a trigger portion integral with the other of said members and forming an actuating means therefor.

10. In a liquid pistol, an integral barrel and handle member formed of a sheet metal stamping, having complementary abutting portions, an extension barrel member and trigger member formed of a sheet metal stamping embraced by said barrel and handle member, and liquid-ejecting means operated by the relative movement of said members.

11. In a liquid pistol, two sheet metal stampings each having abutting complementary portions, one of said stampings forming an integral barrel and handle member and the other of said stampings forming an extension barrel and trigger section telescopically engaged and embraced by said barrel and handle section, and means for ejecting liquid upon the relative movement of said members.

12. A liquid pistol, comprising a sheet metal stamping having complementary abutting portions forming a barrel and handle, and a second sheet metal stamping having complementary abutting portions forming an extension barrel and a flat trigger and guard member, said extension barrel telescopically engaging the main barrel and said trigger and guard section telescopically engaging said handle.

13. In a liquid pistol, a barrel containing a liquid chamber telescopically collapsible to eject the liquid, and a trigger controlling the collapsing of said barrel.

14. In a liquid pistol, a barrel and handle member containing a liquid chamber telescopically collapsible to eject the liquid, and a trigger member slidable in relation to said barrel and handle member, for directly actuating said telescopically collapsible liquid chamber.

15. In a liquid pistol, a liquid containing barrel provided with a small aperture constituting a direct jet discharge, a piston slidable in relation to said barrel and a trigger effecting when moved rearwardly, a relative movement between said barrel and piston to directly and positively eject the liquid contents through said jet aperture.

In testimony whereof I affix my signature in presence of two witnesses.

CHARLES F. LEFEVER.

Witnesses:
W. B. Lombard,
E. C. Hough.